United States Patent
Nakazawa et al.

[11] Patent Number: 5,859,714
[45] Date of Patent: Jan. 12, 1999

[54] HEAD-UP DISPLAY, A COMBINER USED FOR THE HEAD-UP DISPLAY AND A METHOD OF DESIGNING THE HEAD-UP DISPLAY

[75] Inventors: Norihito Nakazawa; Masahiro Hirano, both of Yokohama, Japan

[73] Assignee: Asahi Glass Company, Ltd., Tokyo, Japan

[21] Appl. No.: 780,218

[22] Filed: Jan. 8, 1997

Related U.S. Application Data

[63] Continuation of Ser. No. 598,620, Feb. 12, 1996, abandoned, which is a continuation of Ser. No. 341,133, Nov. 16, 1994, abandoned.

[30] Foreign Application Priority Data

Nov. 16, 1993 [JP] Japan .................................. 5-286839

[51] Int. Cl.⁶ .............................. G02B 5/32; G02B 27/10
[52] U.S. Cl. .................................................. 359/13; 359/24
[58] Field of Search .......................... 359/13, 14, 22, 359/24

[56] References Cited

U.S. PATENT DOCUMENTS

| | | | |
|---|---|---|---|
| 3,915,548 | 10/1975 | Opittek et al. | 359/19 |
| 4,457,579 | 7/1984 | Thylén | 359/13 |
| 4,582,394 | 4/1986 | Boyd | 359/13 |
| 4,900,133 | 2/1990 | Berman | 359/13 |
| 5,153,751 | 10/1992 | Ishikawa et al. | 359/24 |
| 5,210,624 | 5/1993 | Matsumoto et al. | 359/14 |
| 5,475,512 | 12/1995 | Nakazawa et al. | 359/13 |

*Primary Examiner*—Jon Henry
*Attorney, Agent, or Firm*—Oblon, Spivak, McClelland, Maier & Neustadt, P.C.

[57] ABSTRACT

As a combiner, a hologram prepared by exposure to light is used wherein a combination of the central wavelength $\lambda$, the halfwidth $\Delta\lambda$ and the diffraction efficiency $\eta$ of the diffraction spectrum of light minimizes the color difference between the color tone of light from a light source and the color tone in average of reflection light by the combiner, when observed by changing the angle, or the sum of the square of the color differences between the color tone of the light from the light source when observed by changing the angle and the color tone of the reflection light by the combiner. Then, the color tone of the light transmitting from the outside of a vehicle through the combiner, the light being observed by the driver of the vehicle, and the color tone of an outer light reflected by the combiner, the light being observed at the outside of the vehicle, approach a white color in comparison with use of a conventional combiner, whereby a transparent eyesight without any complementary color is given to the driver to thereby increase safety. Further, a head-up display which reduces a change of color even though an observer outside the vehicle looks at the combiner at any angular position and which gives a color tone near a white color, can be provided.

15 Claims, 7 Drawing Sheets

HEAD-UP DISPLAY, A COMBINER USED FOR THE HEAD-UP DISPLAY AND A METHOD OF DESIGNING THE HEAD-UP DISPLAY

This application is a continuation of application Ser. No. 08/598,620, filed on Feb. 12, 1996, now abandoned, which is a continuation of application Ser. No. 08/341,133, filed on Nov. 16, 1994, now abandoned.

BACKGROUND OF THE INVENTION

1. Field of the Invention

The present invention relates to a head-up display (hereinbelow, referred to as a HUD) for displaying a driving information to a driver in a vehicle, a combiner used for the same and a method of designing the head-up display.

2. Discussion of Background

Recently, there has been used a HUD as a method of displaying information to a driver in a vehicle. The HUD is so constructed that the driver can read information without substantially moving his eye point in his state of driving by displaying an optical information projected from an information projecting means such as a liquid crystal display device or the like on a combiner such as a hologram, a half mirror or the like which is installed at a windshield glass or the like of the vehicle.

In particular, the combiner comprising a hologram can diffract an optical information to the eyesight direction of the driver because the hologram has a feature capable of diffracting an optical information to the driver as well as functioning as a lens. Further, it can form an image at an optional position without using an optical system such as a lens or the like and can display an image having a high luminance without deteriorating the luminance of the foreground. Therefore, the hologram is effective to the combiner for a HUD.

Figure 11:
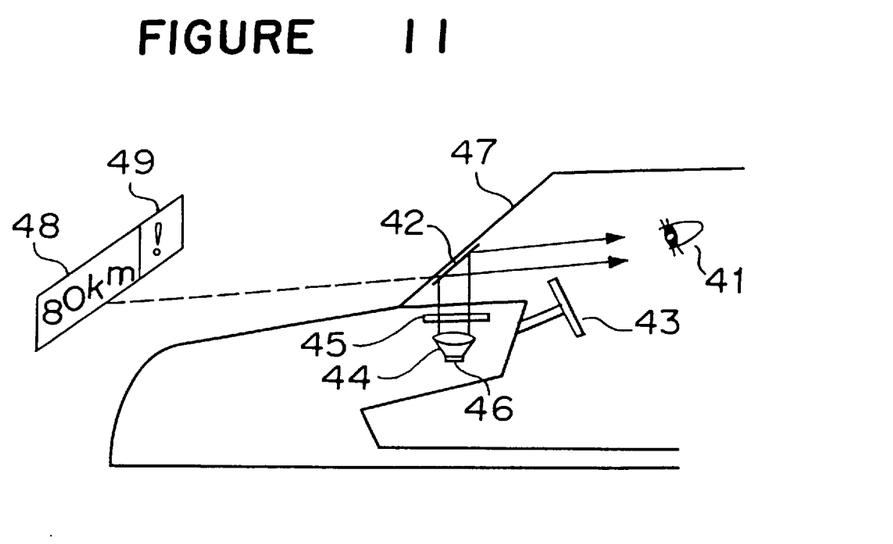
FIG. 11 is a cross-sectional view showing a conventional HUD for a vehicle.

FIG. 11 is a diagram showing an example of a conventional HUD. Light 43 including information to be displayed, emitted from a light source 46 and passed through a transparent type liquid crystal display element 45 through a lens system 44, is irradiated on a hologram 42 arranged in a windshield glass 47 of a vehicle body. The light is diffracted at the hologram to be seen by the driver at his observing position 41.

The lens system 44 functions as a collimator. Further, the function of the lens can be shared by the hologram 42, and a speed displaying image 48 and an alarm displaying image 49 can be formed at a distant place.

Since the hologram 42 has a specified wavelength selective function, it is possible to display an image having a desired color. Usually, color to be displayed is single. However, a display having plural kinds of color is possible by means of multiple exposure to light so that the quantity and the quality of information to be displayed can be improved. For instance, the speed displaying image 48 is shown in a green color and the alarm display image 49 is shown in red whereby it is possible to transmit correctly information to the driver.

Figure 8:
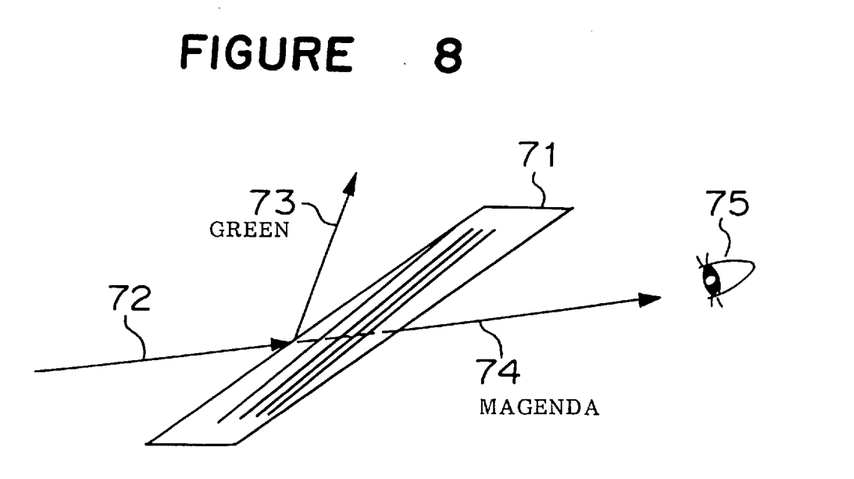
FIG. 8 is a diagram explaining a transmission color by a conventional hologram.

As described above, since the conventional HUD diffracts the light having a specified wavelength, when the driver looks at something outside through the hologram, the color of transmitting light is the complementary color of a displayed color corresponding to the diffraction wavelength of the hologram. Namely, as shown in FIG. 8, when a displayed color is only green, a white light 72 from the outside is partly reflectively diffracted by a diffraction grating in the hologram during the transmission of the light through the hologram 71, and the reflection light 73 becomes green. Accordingly, the transmission color of a transmitting light 74 is magenta (pink-red) as the complementary color of the diffraction light, and the driver 75 may feel stimulative and uncomfortable to the transmission color. Further, the color tone of the background is also influenced by the complementary color, and visibility to circumstances such as a road or the like outside of the vehicle is impaired during cruising whereby there is a problem of safety.

Figure 9:
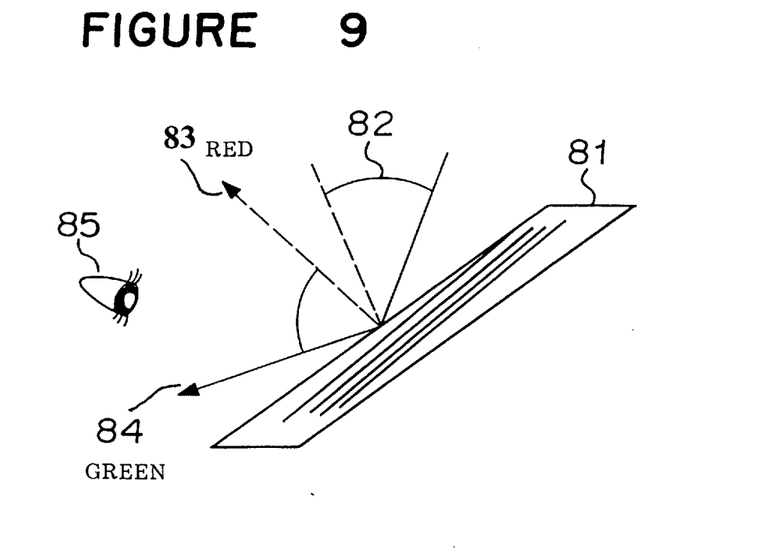
FIG. 9 is a diagram explaining a reflection color by the conventional hologram.

On the other hand, as shown in FIG. 9, with respect to an observer 85 outside of the vehicle (a walking passenger or a driver in an opposing car), the color of a reflection light of outer light 82 is substantially changed from a red color 83 (observation from the front) to a green color 84 (observation from a slant position) depending on an angle of observation, due to the angle dependence of a diffraction wavelength by the diffraction grating in the hologram 81. The color change also gives uncomfortable impression. Therefore, there were problems in the design and the quality of the combiner used, hence the vehicle itself which installs therein the combiner.

Figure 10:
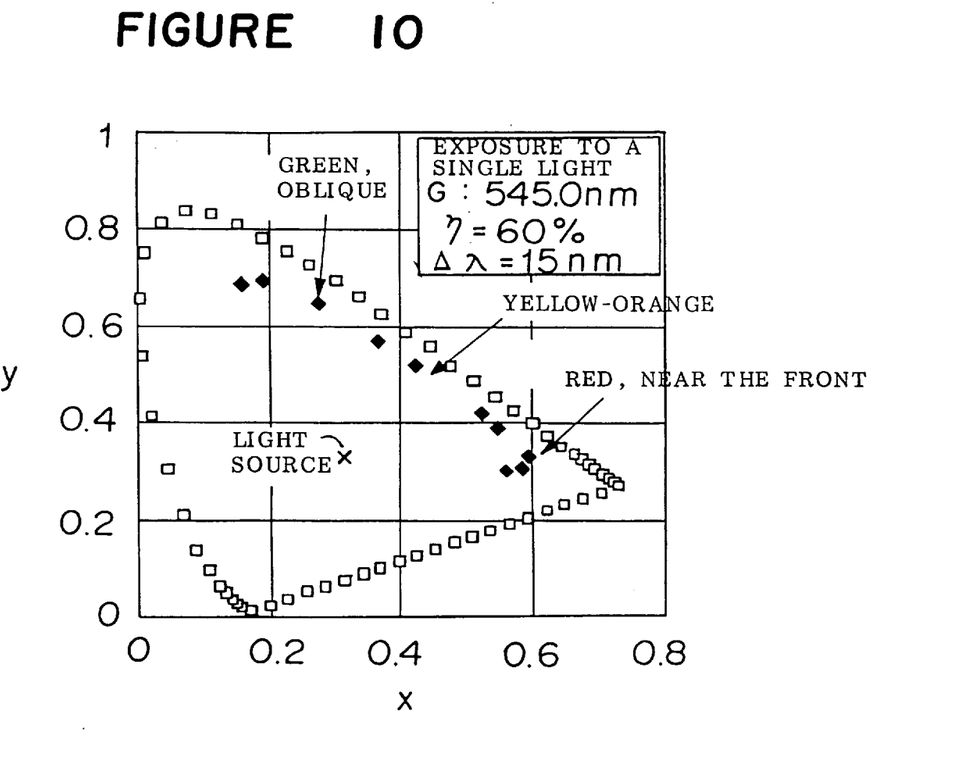
FIG. 10 is a chromaticity diagram showing a change of color of a reflected outer light from the conventional hologram.

FIG. 10 is a chromaticity diagram showing a result of simulation concerning the color change of reflection colors. The chromaticity diagram is to show quantitatively colors by chromaticity coordinates x and y ruled in JIS-Z8701 (Japanese Industrial Standards, which provides specification of colors according to the CIE (Commission International de l'Eclairage). In FIG. 10, a point indicated by a mark x as a light source expresses a white color. When the color of the hologram is closer to this point, the color is closer to a white color, which is more preferable to an observer.

However, the color of a reflection light of a monochromatic hologram used for the conventional HUD is changed as shown by marks ♦ in FIG. 10 when the hologram has a wavelength of 545 nm and a diffraction efficiency of 60%, for instance. Namely, it is understood that a red color is provided around a front position and there is a great color-change from an orange color through an yellow color to a green color as the position of observation shifts to a further oblique position. When the hologram is viewed from the front, a red color as a stimulative color is provided, and when it is viewed from a slant position, it looks a glaring green color having a high luminous efficacy is provided to thereby give an uncomfortable impression to the observer.

In order to improve the color tone of a reflection light to an observer outside a vehicle and in order to improve the color tone of a reflection light by a first hologram used for display, Japanese Unexamined Patent Publication No. 110984/1992 and U.S. Pat. No. 5,153,751 disclose a HUD wherein a second hologram for reflecting the color near the complementary color of the reflection color of the first hologram is laminated or exposed multiply to light. However, since the proposed hologram was formed with two holograms corresponding to two colors, there was sometimes impossible to improve completely the color tone. In particular, there was no light having the wavelength corresponding to the complementary color with respect to a green color light (having a wavelength of about 500–560 nm) which is frequently used for a display color. Accordingly, the proposed technique had a drawback which was difficult to improve the color tone of the reflection light and could not improve the color tone of a transmission light.

Further, in order to improve the color tone of a transmission light through the combiner, Japanese Unexamined Patent Publication No. 179418/1991 discloses a HUD in which an optical element capable of reflecting or attenuating light having a wavelength $\lambda_2$ which is a complementary color of a reflection wavelength $\lambda_1$ of a hologram for displaying is combined. In this publication, however, since color correction was made by a two color structure in the same manner as the above, there was a similar drawback that complete improvement could not be achieved with respect to a green color light, and an improvement in the color tone of reflection light was not made.

Figure 12:
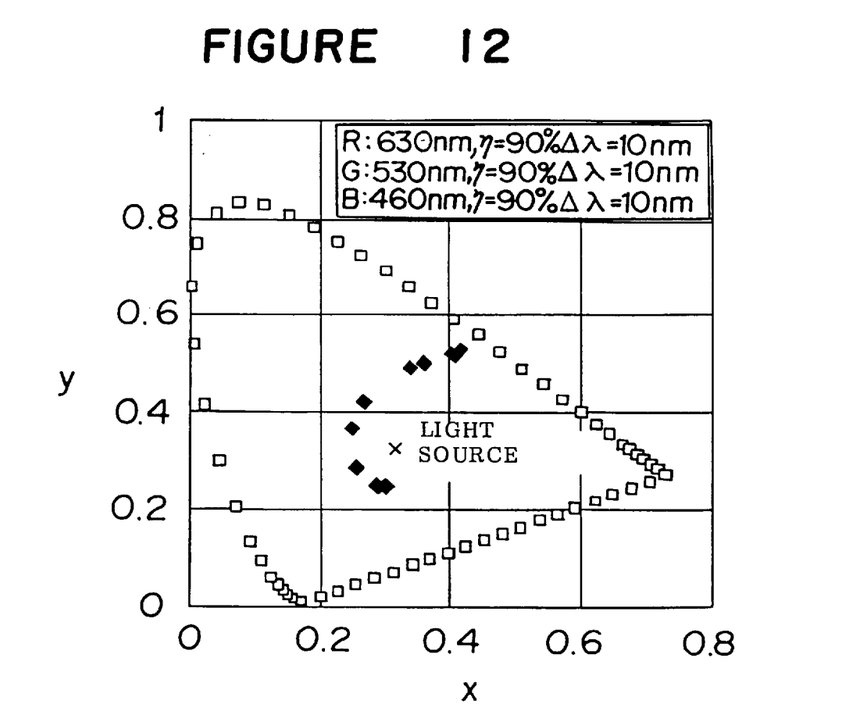
FIG. 12 is a chromaticity diagram showing a change of color of a reflected outer light from a conventional hologram without having the optimized diffraction characteristics.

Japanese Unexamined Patent Publication No. 291221/1992 discloses a HUD in combination of an optical element which reflects or attenuates light having a plurality of wavelength regions capable of synthesizing light having a wavelength region which forms the complementary color of a reflection wavelength $\lambda_1$ of a hologram for displaying, in order to improve the color tone of a transmission light of a combiner to a green color light. In this publication, since improvement to only the color tone of transmission light is made, it is effective only to a specified angle connecting the hologram to an observer. Accordingly, the improvement of the color tone of the reflection light by the hologram to an observer outside of the vehicle was not always made. For instance, in an example of the publication, a hologram for diffracting light of 460 nm and 630 nm which is capable of synthesizing the complementary color of light of 530 nm is used in order to improve the color tone of the transmission light of the hologram which diffracts light of 530 nm. Further, a transmission characteristic diagram wherein there are a diffraction efficiency of about 90% and a halfwidth of about 10 nm is shown. Simulation of the color tone of a reflection color of the combiner based on the characteristic diagram in a case that the reflection color is observed outside of the vehicle results in as shown in FIG. 12. From the Figure, it is understood that the color is a yellowish green in observation from the front although it is closer to a white color in observation from an oblique position.

As described above, although proposals were made to use a plurality of holograms in order to improve the color tones of reflection lights and transmission lights of a holographic combiner, there were problems that a sufficient effect of improvement has not been obtained since the characteristics could not be optimized.

SUMMARY OF THE INVENTION

The present invention is to eliminate the above-mentioned problems and to provide a head-up display which comprises an information display source, comprising at least a light source and a display device for displaying information to be displayed, which produces information to be displayed by means of light, and a combiner arranged at a windshield glass of a vehicle to diffract the light to an observer in a vehicle, wherein the combiner comprises a hologram which is prepared by exposure to a plurality of color lights which are so selected as to bring the color tone of an outer light transmitting from the outside of the vehicle through the combiner to the inside of the vehicle and the color tone of a reflection light to be observed at the outside of the vehicle of the outer light reflected by the combiner, closer to white even when the lights are observed at any angular position, wherein the diffraction spectrum of light generated from the information display source, when the light is diffracted toward the observer inside the vehicle, has a combination of the central wavelength $\lambda$, the halfwidth $\Delta\lambda$ and the diffraction efficiency $\eta$, and wherein the exposure to light of the hologram is such that the combination minimizes the color difference between the color tone of the light from the light source and the color tone in average, when the light is observed by changing the angle of observation, of the reflection light reflected by the combiner, or minimizes the sum of the square of color differences between the color tone of the light of the light source and the color tone of the reflection light by the combiner when it is observed by changing the angle of observation.

According to the present invention, there is provided a combiner for a head-up display which is disposed at a windshield glass of a vehicle to diffract light including information generated from an information display source toward an observer in the vehicle, the combiner being characterized in that the combiner comprises a hologram which is prepared by exposure to a plurality of color lights which are so selected as to bring the color tone of an outer light transmitting from the outside of the vehicle through the combiner to the inside of the vehicle and the color tone of a reflection light to be observed at the outside of the vehicle of the outer light reflected by the combiner, closer to a white color even when the lights are observed at any angular position, wherein the diffraction spectrum of light generated from the information display source, when the light is diffracted toward the observer inside the vehicle, has a combination of the central wavelength $\lambda$, the halfwidth $\Delta\lambda$ and the diffraction efficiency $\eta$, and wherein the exposure to light of the hologram is such that the combination minimizes the color difference between the color tone of the light from the light source and the color tone in average, when the light is observed by changing the angle of observation, of the reflection light reflected by the combiner, or minimizes the sum of the square of the color differences between the color tone of the light from the light source when it is observed by changing the angle of observation and the color tone of the reflected light by the combiner.

Further, in accordance with the present invention, there is provided a method of designing a head-up display comprising an information display source having at least a light source and a display device for displaying information to be displayed, which produces information to be displayed by means of light, and a combiner arranged at a windshield glass of a vehicle to diffract the light to an observer in a vehicle, wherein the combiner comprises a hologram which is prepared by exposure to a plurality of color lights which are so selected as to bring the color tone of an outer light transmitting from the outside of the vehicle through the combiner to the inside of the vehicle and the color tone of a reflection light to be observed at the outside of the vehicle of the outer light reflected by the combiner, closer to a white color even when the lights are observed at any angular position, wherein the diffraction spectrum of light generated from the information display source, when the light is diffracted toward the observer inside the vehicle, has a combination of the central wavelength $\lambda$, the halfwidth $\Delta\lambda$ and the diffraction efficiency $\eta$, and wherein conditions for the exposure to light of the hologram are determined in such a manner that the combination minimizes the color difference between the color tone of the light from the light source and the color tone in average, when the light is observed by changing the angle of observation, of the reflection light reflected by the combiner.

The above-mentioned color difference can be expressed by the following definitions, for instance.

(1) It is a color difference $\Delta\Delta E^*_{ab}$ according to an $L^*a^*b^*$ color system ruled in JIS-Z8730 and is expressed by $\Delta E^*_{ab} = [(\Delta L^*)^2 + (\Delta a^*)^2 + (\Delta b^*)^2]^{1/2}$ where $\Delta L^*$ is the difference of psychometric lightness and $\Delta a^*$ and $\Delta b^*$ are the differences of psychometric chroma coordinates.

(2) It is a color difference $\Delta E^*_{ab}$ according to the $L^*a^*b^*$ color system ruled in JIS-Z8730 and is expressed by $\Delta E^*_{ab} =$ $[(\Delta a^*)^2+(\Delta b^*)^2]^{1/2}$ where the difference of psychometric lightness is $\Delta L^*=0$ and the differences of psychometric chroma coordinates are $\Delta a^*$ and $\Delta b^*$.

(3) It is a color difference $\Delta E^*_{uv}$ according to an L*u*v* color system ruled in JIS-Z8730 and is expressed by $\Delta E^*_{uv}=[(\Delta L^*)^2+(\Delta u^*)^{2+(\Delta V^*)^2}]^{1/2}$ where $\Delta L^*$ is the difference of psychometric lightness and $\Delta u^*$ and $\Delta v^*$ are the differences of psychometric chroma coordinates.

(4) It is a color difference $\Delta E^*_{uv}$ according to an L*u*v* color system ruled in JIS-Z8730 and is expressed by $\Delta E^*_{uv}=[(\Delta u^*)^2+(\Delta V^*)^2]^{1/2}$ where the difference of psychometric lightness $\Delta L^*=0$ and $\Delta u^*$ and $\Delta v^*$ are the differences of psychometric chroma coordinates.

(5) It is a color difference $\Delta E_{AN}$ according to an Adams-Nickerson's color difference formula ruled in JIS-Z8730 and is expressed by $\Delta E_{AN}=40[\{0.23\Delta V_Y\}^2+\{\Delta(V_X-V_Y)\}^2+\{0.4\Delta(V_Z-V_Y)\}^2]^{1/2}$ where $\Delta V_y$ is the difference of psychometric lightness and $\Delta(V_X-V_Y)$ and $\Delta(V_z-V_Y)$ are the differences of psychometric chroma coordinates.

(6) It is a color difference $\Delta E_{AN}$ according to an Adams-Nickerson's color difference formula ruled in JIS-Z8730 and is expressed by $\Delta E_{AN}=40[\{\Delta(V_X-V_Y)\}^2+\{0.4\Delta(V_Z-V_Y)\}^2]^{1/2}$ where the difference of psychometric lightness $\Delta V_Y=0$ and $\Delta(V_X-V_Y)$ and $\Delta(V_Z-V_Y)$ are the differences of psychometric chroma coordinates.

(7) It is a color difference $\Delta E_H$ according to a Hunter's color difference formula ruled in JIS-Z8730 and is expressed by $\Delta E_H=[(\Delta L)^2+(\Delta a)^2+(\Delta b)^2]^{1/2}$ where $\Delta L$ is the difference of psychometric lightness and $\Delta a$ and $\Delta b$ are the differences of psychometric chroma coordinates.

(8) It is a color difference AEH according to a Hunter's color difference formula ruled in JIS-Z8730 and is expressed by $\Delta E_H=[(\Delta L)^2+(\Delta a)^2+(\Delta b)^2]^{1/2}$ where the difference of psychometric lightness $\Delta L=0$ and $\Delta a$ and $\Delta b$ are the differences of psychometric chroma coordinates.

(9) It is expressed by the distance between the chromaticity coordinate point of a light source and the chromaticity coordinate point of a reflection light of a combiner, i.e. $[(\Delta x)^2+(\Delta y)^2]^{1/2}$ in chromaticity coordinates according to an XYZ color system ruled in JIS-Z8701.

(10) It is expressed by the distance between the chromaticity coordinate point of a light source and the chromaticity coordinate point of a reflection light of a combiner, i.e. $[(\Delta x_{10})^2+(\Delta y_{10})^2]^{1/2}$ in chromaticity coordinates according to an $X_{10}Y_{10}Z_{10}$ color system ruled in JIS-Z8701.

(11) It is expressed by the distance between the chromaticity coordinate point of a light source and the chromaticity coordinate point of a reflection light of a combiner, i.e. $[(\Delta u')^2+(\Delta v')^2]^{1/2}$ in chromaticity coordinates according to an L*u*v* color system ruled in JIS-Z8701.

(12) It is expressed by the distance between the chromaticity coordinate point of a light source and the chromaticity coordinate point of a reflection light of a combiner, i.e. $[(\Delta u_{10}')^2+(\Delta v_{10}')^2]^{1/2}$ in chromaticity coordinates according to the L*u*v* color system ruled in JIS-Z8701.

(13) It is expressed by the distance between the chroma of a light source and the chroma of a reflection light of a combiner according to a color displaying system based on the attributions, i.e., hue, lightness and chroma, ruled in JIS-Z8721.

(14) It is expressed by the difference between the chroma of a light source and the Munsell's chroma of a reflection light of a combiner in a Munsell's color system proposed by A. H. Munsell and ruled by the color measuring committee in Optical Society of America in 1943.

The color systems in JIS standard are based on CIE standard. Namely, the XYZ color system is shown in CIE 1931 standard; the $X_{10}Y_{10}Z_{10}$ color system is based on CIE 1964 standard; and the L*u*v* color system and the L*a*b* color system are shown in CIE 1976 standard.

These color differences are all the functions of the central wavelength λ, the halfwidth Δλ and the diffraction efficiency η of light diffracted by holograms. Namely, these color differences are obtainable from tristimulus values X, Y, Z of a non-luminous object color which are caused by reflection and transmittance of light in the XYZ color system (other color systems are expressed by the XYZ color system).

The tristimulus values X, Y, Z of an object obtained by reflection of light in the XYZ color system are determined by formulas described below.

$$X = K\int_{380}^{780} S(\lambda)\bar{x}(\lambda)R(\lambda)d\lambda$$

$$Y = K\int_{380}^{780} S(\lambda)\bar{y}(\lambda)R(\lambda)d\lambda$$

$$Z = K\int_{380}^{780} S(\lambda)\bar{z}(\lambda)R(\lambda)d\lambda$$

$$K = 100/\left[\int_{380}^{780} S(\lambda)\bar{y}(\lambda)d\lambda\right]$$

The tristimulus values X, Y, Z of a non-luminous object color obtained by transmission of light in the XYZ color system are determined by the formulas described below.

$$X = K\int_{380}^{780} S(\lambda)\bar{x}(\lambda)\tau(\lambda)d\lambda$$

$$Y = K\int_{380}^{780} S(\lambda)\bar{y}(\lambda)\tau(\lambda)d\lambda$$

$$Z = K\int_{380}^{780} S(\lambda)\bar{z}(\lambda)\tau(\lambda)d\lambda$$

$$K = 100/\left[\int_{380}^{780} S(\lambda)\bar{y}(\lambda)d\lambda\right]$$

In the above-mentioned formulas, S(λ) indicate the spectral distribution of light of the standard light source; $\bar{x}(\lambda)$, $\bar{y}(\lambda)$ and $\bar{z}(\lambda)$ are color matching functions in the XYZ color system, and R(λ) and τ(λ) are respectively the spectral distribution of spectral reflectance factors and the spectral distribution of spectral transmittance factors, that are so-called diffraction spectral.

On the other hand, when a hologram exposed to light at a specified angle is observed from an angular direction, the central wavelength λ, the halfwidth Δλ and the diffraction efficiency η of the diffraction spectrum of the hologram is determined by R(λ) and τ(λ), and calculated on the basis of Bragg conditions and Herwing Kogelink's Coupled Wave Theory (THE BELL SYSTEM TECHNICAL JOURNAL Vol. 48, pp 2909–2947(1969) ° 'Coupled Wave Theory for Thick Hologram Gratings'). Accordingly, it is understood that the color differences are the functions of the central wavelength A, the halfwidth Δλ and the diffraction efficiency η.

Thus, the central wavelength $\lambda_c$, the halfwidth $\Delta\lambda$ and the diffraction efficiency $\eta$ can be selected in various ways on the basis of the above-mentioned formulas so as to reduce the color differences.

DETAILED DESCRIPTION OF PREFERRED EMBODIMENTS

Several embodiments of the present invention will be described with reference to the drawings.

Figure 1:
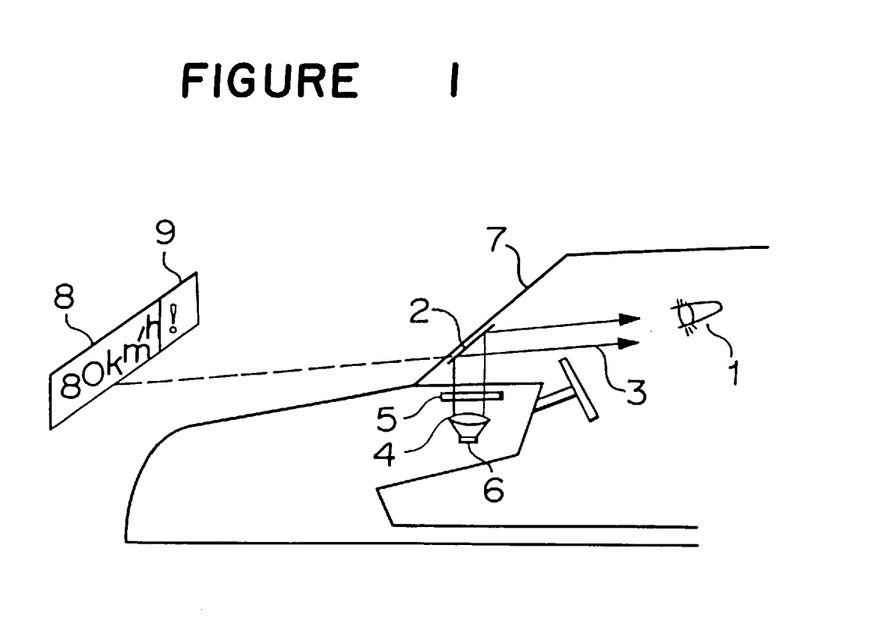
FIG. 1 is a schematic view showing an embodiment of the HUD of the present invention.

FIG. 1 is a schematic view showing an embodiment of the HUD of the present invention. An information display source is disposed below a windshield glass 7. The information display source is to provide information to be displayed as light 3 which is passed through a display device 5 comprising a transparent type color liquid crystal display element via a lens system 4 as a collimeter, the light being emitted from a light source 6 using a hot cathode ray tube or the like. The light 3 is irradiated to and diffracted by a combiner 2 comprising a hologram which is disposed on the windshield glass 7 of a vehicle, whereby it is recognized by a driver at its position of observation 1.

The lens system 4 has a function as the collimator. However, the lens system 4 can be omitted by sharing its function to the hologram. By sharing the function as a lens to the hologram, a speed display image 8 and an alarm display image 9 can be focused in a remote distance.

Another hologram or lens or the like may be disposed between the display device 5 and the combiner 2 in order to correct aberration, if required.

Further, since the hologram has a wavelength selective function, it is possible to display an image having a desired color. In addition, a multi-color display is possible by multiple exposure to light or the lamination of a plurality of holograms, whereby the quantity and the quality of information to be displayed can be improved. For instance, by displaying the speed displaying image 8 with a green color, the alarm displaying image 9 with a red color or an amber color (an orange color) obtained by mixing a green color with a red color, it is possible to transmit correctly information to the driver.

Figure 2:
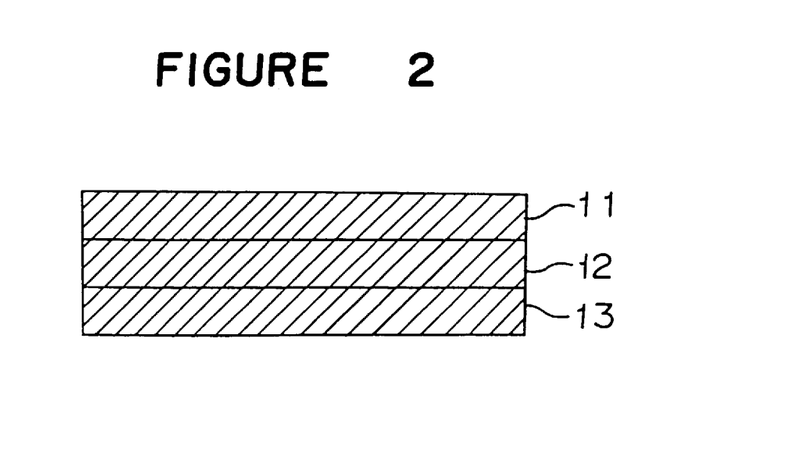
FIG. 2 is a schematic cross-sectional view showing an embodiment of the construction of the hologram of the present invention.

FIG. 2 is a schematic cross-sectional view showing an embodiment of the construction of the hologram according to the present invention. In this embodiment, three holograms are laminated, which are exposed to light having wavelengths corresponding to three original colors. The diffraction wavelength of each of the holograms is made in correspondence to the peak of light emitted from a hot cathode ray tube as a light source. Specifically, in consideration of an incident angle and a diffraction angle (in this embodiment, an incident angle is: 45° and a diffraction angle is: 60°) in view of the arrangement of the information display source and the arrangement of the combiner which are determined by the specification of a vehicle, the holograms are exposed to light so that a first hologram 11 reflects and diffracts the light having a peak wavelength of 612 nm (red); a second hologram 12 reflects and diffracts the light having a peak wavelength of 545 nm (green) and a third hologram 13 reflects and diffracts the light having a peak wavelength of 433 nm (blue).

The hologram of the present invention may be of a lamination type as shown in FIG. 2. However, a single hologram obtained by multiple exposure to light wherein a laser beam having a plurality of wavelengths is irradiated to a single photosensitive material may be used. This is preferable because a shift of an image of each wavelength and reduction in the transmittance of the combiner which may cause in a case of using a lamination type can be prevented.

Each of the holograms is exposed to light so that the slant angle of diffraction gratings formed inside of it is the same with each other. Thus, when the incident angles of all color lights entering into the hologram are the same, the diffraction angles diffracted by the hologram are the same for all color lights. When these angles are different, the direction of diffracted color lights varies. Accordingly, the light from the hologram is not white color but is split into three colors, which recognized by an observer as uncomfortable colors.

In order to form a reflection type hologram wherein the slant angles of the diffraction gratings formed inside of each of the holograms are same, the incident angle of a laser beam, which is irradiated to both surfaces of a photosensitive material for the hologram, should be the same for colors at each surface of the photosensitive material. There is another way not to make the incident angle of all laser beam for exposure identical. Namely, the slant angles of the diffracting gratings formed inside of the hologram can be the same by adjusting the incident angle of a laser beam having a single or two peak wavelengths to be introduced to both sides of a photosensitive material for the hologram.

In this embodiment, three holograms are laminated. The laminated holograms are respectively exposed to light having three kinds of wavelengths corresponding to a red color, a green color and a blue color, whereby the color tone of an outer light transmitting through the laminated type hologram and the color tone of the outer light reflected by the laminated type hologram approach a white color even when it is observed from any angular position. With respect to the diffraction light of light from the information display source, which enters into the lamination type hologram exposed to light as described above, the central wavelength of the diffraction spectrum is (red, green, blue)=(612 nm, 545 nm, 433 nm) and the halfwidth is (red, green, blue)=(15 nm, 15 nm, 15 nm). With respect to the diffraction efficiency, decision of optimization was made so as to minimize the color difference between the color tone of light from the light source and the color tone in average of a reflection light by the combiner when observed by changing the angle.

In order to obtain the color difference, a formula $\Delta E_{ab} = [(\Delta a^*)^2 + (\Delta b^*)^2]^{1/2}$ in the color difference formula in the L*a*b* color system ruled in JIS-Z8730 was used wherein the formula $\Delta E^*_{ab}$ is given when the term of the difference of psychometric lightness $\Delta L^*$ is 0, namely, the difference of psychometric chroma coordinates are expressed by $\Delta a^*$ and $\Delta b^*$.

Observation was conducted in a vertical cross-sectional surface (for instance, in the paper surface of FIG. 9) by changing angle. The observation angle was in a range of $-70°$ to $+50°$ to the hologram, and points of observation were determined to be N=13 by changing the angle for each 10°. When the psychometric chroma coordinates of the color tone of a reflection light at each point are expressed by $a^*_i$ and $b^*_i$, the psychometric chroma coordinates of the color tone in average are expressed by $(\Sigma a^*_i)/N$, $(\Sigma b^*_i)/N$ (i=1 to 13). As the light source, a standard light $D_{65}$ ruled in CIE standard was used. From the definition, the psychometric chroma coordinates of the light source are respectively $a=0$ and $b^*=0$. Accordingly, the color difference between the color tone in average of reflection light and the color tone of the light source is expressed by $\Delta E_{ab} = [(\Delta a^*)^2 + (\Delta b^*)^2]^{1/2} = [\{(\Sigma a^*_i)/N\}^2 + \{(\Sigma b^*_i)/N\}^2]^{1/2}$. In this embodiment, the diffraction efficiency of the three color holograms was determined to be (red, green, blue)=(20%, 60%, 60%) to minimize $\Delta E^*_{ab}$.

In this embodiment, the central wavelength $\lambda$, the halfwidth $\Delta\lambda$ and the diffraction efficiency $\eta$, were determined so as to minimize the color difference. The minimization of color difference is an example of the most preferable case. In determination of reducing the color difference, an error of about 10% with respect to the minimum value of color difference is sufficient to provide an allowable color tone as a commercial product, when the hologram is observed, view of the design and the quality. However, the above-mentioned range is not limited as far as the color difference is in an allowable range.

Figure 3:
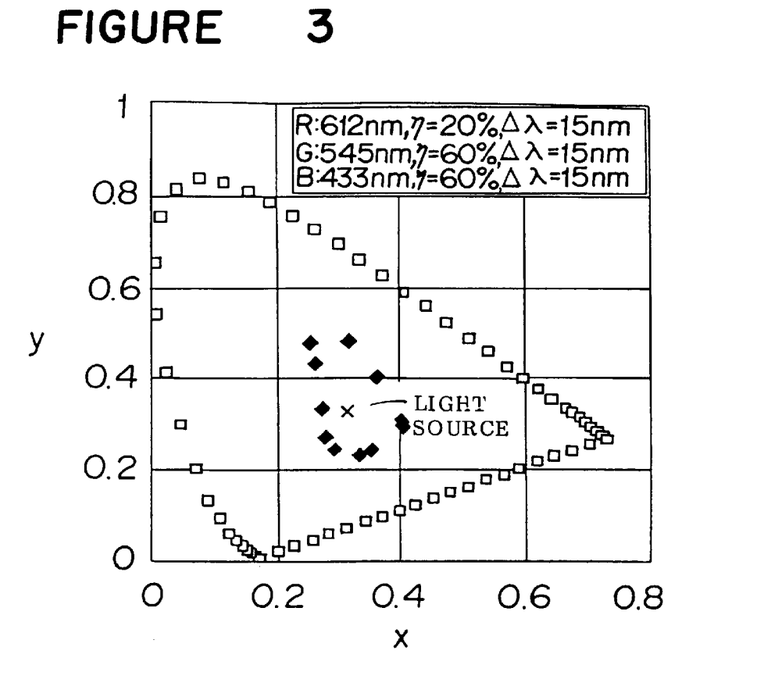
FIG. 3 is a chromaticity diagram showing a change of color of a reflected outer light from the hologram of the present invention.

FIG. 3 is a chromaticity diagram showing a color change in a reflected outer light by the three color hologram prepared according to this embodiment in a case that it is observed by changing observation angle. The hologram provides a small change of color in comparison with a single color hologram shown in FIG. 7 and a three color hologram without having the optimized diffraction characteristic of hologram shown in FIG. 9. In the figures, color points are apart from the peripheral curve portions in the chromaticity diagram and approach the light source in a view from any angle of observation, and the color tones approach a white color.

In this case, it is considered that the color of transmittance light is approximately in relation of complementary color to the color of reflection light. Accordingly, if the hologram and the windshield glass have no color, the color of transmittance becomes a color tone near a position of point symmetry with respect to the light source having a mark x in FIG. 3. Namely, when the color tone of the reflection color approaches a white color, the color tone of the transmittance color also approaches a white color.

As described above, the hologram of the present invention could improve the color tone of the reflection color as well as the transmittance color in comparison with the conventional hologram.

Thus, a HUD having improved color tone of the reflection color and the transmittance color of an outer light could be realized by using the combiner wherein the hologram according to this embodiment is sealed in a windshield lamination glass of a vehicle.

Generally, a hologram has a surface area of a square of several tens mm through several hundreds mm and a thickness of from several $\mu$m through several tens $\mu$m, and has a light diffraction function. For the hologram, a volume-phase type hologram such as a Lippmann type is preferable because a high diffraction efficiency can be obtained. However, a hologram of the so-called emboss type or rainbow type may be used. As material for the hologram, photopolymer such as polyvinylcarbazol, an acryl series or the like, dichromated gelatin, photoresist, silver halide emulsions and so on may be used.

Such hologram is provided at a windshield glass. For instance, it may be provided at a surface (an outer front surface) of the windshield glass of a vehicle or an inner surface of the vehicle. From the standpoint of protecting the hologram, it is preferable to seal it inside the windshield glass formed of a laminated glass.

The information display source used for the present invention has a function of emitting light for display. Light emitted from a light source such as a hot cathode tube (HCT), a cold cathode tube, a vacuum fluorescent display tube (VF), a halogen lamp, a LED or the like is irradiated to a display device such as a liquid crystal display element, i.e., a non-emission type display element. Further, it may have these functions.

When the combiner for the present invention is used for a color display, a color liquid crystal display element comprising a color filter and a transparent type twist nematic liquid crystal element or a supertwist nematic type liquid crystal display element is preferably used. With this, light emitted from a single light source is irradiated as light having a desired color.

Thus, light having a plurality of colors can be produced from the same information display source. When the light having a plurality of colors is simultaneously displayed, a display image is displayed in an overlapping state. In order to prevent the overlapping of display images, a color filter is combined with the light source if required, or the color liquid crystal display element may be controlled so that a plurality of colored lights are not simultaneously irradiated.

Alternatively, the above-mentioned light source itself is arranged in a pattern without using the light receiving type display element, so that a specified information can be produced as light. In a case of combining the light source with the light receiving type display element, a suitable light aligning means such as a lens system, a reflector having a curved surface and a suitable light guide means such as a light introducing plate may be arranged between the light receiving type display element and the light source. Further, a light polarizing element or a non-linear optical element such as $KNO_3$ may be arranged in a light path through which light is projected to the hologram, if necessary.

When the HUD of the present invention is used for a color display, a color image can be formed in the same plane by determining the distance from the combiner to the displayed image to be the same with respect to each color. Further, when the distance is changed for a specified color, a threedimensional image in which the distance is different for displayed colors can be obtained.

In this embodiment, explanation has been made as to the hologram displayed in three colors. However, the same effect is obtainable with a hologram capable of displaying an image in four or more kinds of color.

The hologram used for the present invention may be a HUD using a transparent type hologram instead of the above-mentioned reflection type hologram.

As the second embodiment, a case that a hologram exposed to three color lights is multiply exposed on a single photosensitive material having a thickness of 20 $\mu$m will be described. The hologram was exposed to light so that the peak of each of the diffraction wavelengths was 612 nm for a red color, 545 nm for a green color and 433 nm for a blue color wherein the incident angle of light passing through the information display source to the combiner, when the combiner is provided on a windshield glass, is 45° and the diffraction angle of light to an observer inside the vehicle was 60°. The diffraction efficiency and the halfwidth were determined under the optimum conditions so that the sum of the square of color differences of the color tone of the light source from the color tone of reflection light by the combiner be minimized when the combiner was observed by changing the angle. In the same manner as the first embodiment, the formula $\Delta E^*_{ab}=[(\Delta a^*)^2+(\Delta b^*)^2]^{1/2}$ was used for the color difference $\Delta E^*_{ab}$ according to the color difference formula in the L*a*b* color system ruled in JIS-Z8730 where the term of the difference of psychometric lightness $\Delta L^*$ is 0, i.e. the differences of psychometric chroma coordinates are $\Delta a^*$ and $\Delta b^*$.

Observation was conducted in the vertical cross-sectional surface (for instance, in the paper surface of FIG. 6) by changing the angle. The range of observation angle was $-70°$ to $+50°$ to the hologram, and points of observation were determined to be N=121 by changing the angle for each 1°. The psychometric chroma coordinates of the color tone of the reflection light at each point were $a^*_i, b^*_i$. When $D_{65}$ is used as a light source, the psychometric chroma coordinates of the light source are a=0 and b*=0 from the definition. Accordingly, the sum of the square of the color differences between the color tone of light from the light source and the color tone of the reflection light by the combiner, which is to be minimized, is given by $\Sigma(\Delta E^*_{abi})^2=\Sigma[(\Delta a^*_i)^2+(\Delta b^*_i)^2]=\Sigma[(a^*_i)^2+(b^*_i)^2]$, (i=1 to 121). In this embodiment, the diffraction efficiency and the halfwidth of the hologram of three original color were optimized so as to minimize the value $\Sigma(\Delta E^*_{abi})2$, namely, the diffraction efficiency and the halfwidth were respectively determined to be (red, green, clue)=(35%, 60%, 65%) and (red, green, blue) =(8 nm, 8 nm, 5 nm).

Figure 4:
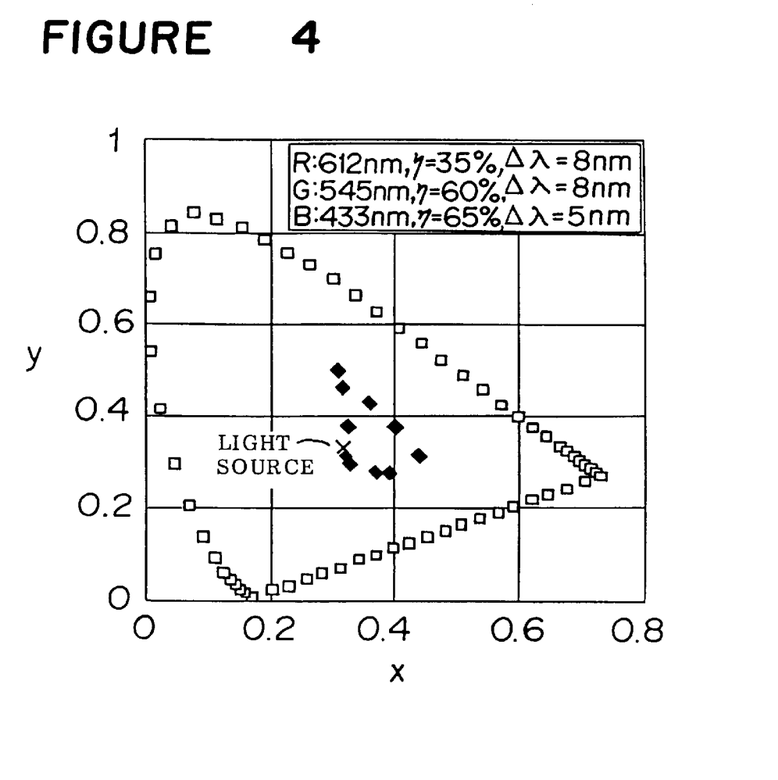
FIG. 4 is a chromaticity diagram showing a change of color of a reflected outer light from the hologram of the present invention.

FIG. 4 is a chromaticity diagram showing a change of the reflection color of an outer light of the hologram of this embodiment. As is understood from FIG. 4, a color change in the reflection color of the outer light of the hologram does not surround the light source as seen in the first embodiment. However, the distances between the light source and points of color change in the chromaticity diagram are closer than those of the first embodiment as a whole, and it is understood that the color tone of the hologram approaches a white color.

As the third embodiment, a case that a hologram exposed to three color lights is multiply exposed to a single photosensitive material having a thickness of 20 $\mu$m in the same manner as the second embodiment, is described. In this embodiment, the hologram was exposed to light so that the diffraction wavelengths are respectively 637 nm for red, 540 nm for green and 448 nm for blue in the same manner as the first embodiment wherein the incident angle of light from the information display source to the combiner, when the combiner is provided at a windshield glass, is 50° and the diffraction angle to an observer in the vehicle was 65°.

The determination of optimization was made with respect to the diffraction efficiency and the halfwidth so as to minimize the sum of the color differences between the color tone of light from the light source and the color tone of the reflection light by the combiner when the combiner was observed by changing the angle.

In order to determine the color differences, the distance between the chromaticity point of the light source and the chromaticity point of the reflection light in the chromaticity coordinates according to the XYZ color system ruled in JIS-Z8701, i.e., $((\Delta x)^2+(\Delta y)^2)^{1/2}$, is used in the same manner as the first embodiment.

Observation was conducted in the vertical cross-sectional area (for instance, in the paper surface of FIG. 9) by changing the angle. The range of the angle of observation was $-70°$ to $+50°$ to the hologram, and points of observation were determined to be N=13 by changing the angle for each 10°. The chromaticity values of the reflection light at each point were determined to be $x_i$ and $y_i$. When $D_{65}$ is used as a light source, the chromaticity values of the light source are $x_o=0.3127$ and $y_o=0.3291$ from the definition. Accordingly, the sum of the square of the color differences between the color tone of light from the light source and the color tone of the reflection light by the combiner, which is to be minimized, is $\Sigma(\Delta E_{xy})^2=\Sigma[(\Delta x_i)^2+(\Delta y_i)^2]=\Sigma[(x_i-x_o)^2+(y_i-y_o)^2]$, (i=1 to 13).

In this embodiment, the diffraction efficiency and the halfwidth of the hologram of three original colors were optimized so as to minimize the value $\Sigma(\Delta E_{xy})^2$, namely, the diffraction efficiency and the halfwidth were respectively determined to be (red, green, blue)=(60%, 60%, 20%) and (red, green, blue)=(11 nm, 9 nm, 6 nm).

Figure 5:
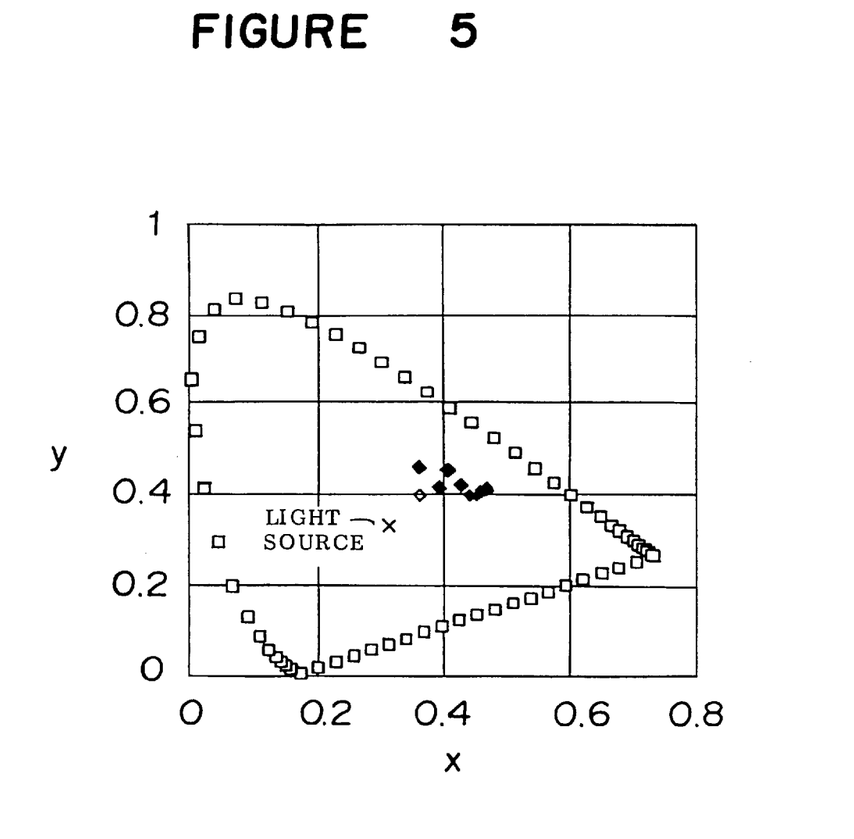
FIG. 5 is a chromaticity diagram showing a change of color of a reflected outer light from the hologram of the present invention.

FIG. 5 is a chromaticity diagram showing a change of the reflection color of an outer light of the hologram of this embodiment. As is understood from FIG. 5, the change of the reflection color of the outer light of the hologram does not surround the light source as seen in the first embodiment. On the other hand, the distance of each chromaticity point to the light source is sufficiently close as a whole. When this embodiment is compared with the first and second embodiments, the degree of whiteness of the color tone of the hologram is small. However, in the observation of the hologram by changing the angle, the change of the color tone is small in comparison with the first and second embodiments. Therefore, the color tone of the hologram can be observed to be pale, and the hologram can be observed to have a color tone near a white color.

Thus, in a holographic combiner exposed to light having a plurality of wavelengths corresponding to the three original colors, when the diffraction characteristics (the central wavelength, the halfwidth and the diffraction efficiency of diffraction spectra) are optimized according to the description of the present invention, the color tone of a reflection light and a transmittance light, which caused problems in conventional techniques, can be improved and a color tone near a white color can be provided.

Further, when the hologram of the present invention is sealed inside a windshield lamination glass of a vehicle to form a combiner, a HUD having an improved color tone of a reflection color and transmission color of an outer light can be realized. The construction of the hologram, a method of the preparation of the same and a light source as a part of a HUD according to this embodiment can be the same as those described in the foregoing embodiments.

Thus, the hologram used as a combiner in the present invention is obtainable by exposing to light having a plurality of central wavelengths corresponding to a plurality of colors which are so selected as to bring the color tone of an outer light transmitting from the outside of the vehicle through the combiner to the vehicle cabin and the color tone of a reflection light of the outer light by the combiner, the reflection light being observed outside of the vehicle, to be closer to a white color, even when the combiner is observed from any angle. Further, the diffraction characteristics (the central wavelength $\lambda$, the halfwidth $\Delta\lambda$ and the diffraction efficiency $\eta$ of the diffraction spectral) of the hologram are determined to be the optimized combination to minimize the color difference between the color tone of light from the light source and the color tone in average of the reflection light by the combiner, when observed by changing the angle, or the optimized combination to minimize the sum of the square of color differences between the color tone of light from the light source and the color tone of the reflection light by the combiner when observed by changing the angle.

Accordingly, the color tone of a transmission light transmitting from the outside of the vehicle through the combiner, which is recognized by an observer such as a driver, and the color tone of a reflection light of an outer light by the combiner, observed at the outside of the vehicle, approach a white color in comparison with the conventional combiner. Further, the hologram provides to the driver a clear eyesight without any complementary color and increases safetyness. For an observer outside of the vehicle, a HUD free from a color change depending on an angle of observation and having a color tone near a white color is provided. In particular, the color tone of a green color light having a wavelength of 500–560 nm, which is frequently used as a display color, can be effectively improved.

Further, according to the combiner of the present invention, since light having at least three colors can be displayed, a HUD wherein a transmission color from the outside of the vehicle and a reflection color observed at the outside are rendered to be a white color, and information of a plurality of colors is displayed, can be obtained.

When the hologram of the present invention is sealed in a windshield glass or attached to the same, an anti-reflection layer should be provided at the inner side of the vehicle with respect to the hologram. The reason is as follows. In a case of sealing the hologram in the windshield glass, an outer light entering from the outside of the vehicle transmits straight, in the presence of the anti-reflection layer through the inner side surface of the windshield glass which is usually made of a laminated glass. Accordingly, there is no reflection light produced in the glass, which is observed as a flare light. Accordingly, the production of the flare light due to an outer light can be effectively reduced.

Figure 6:
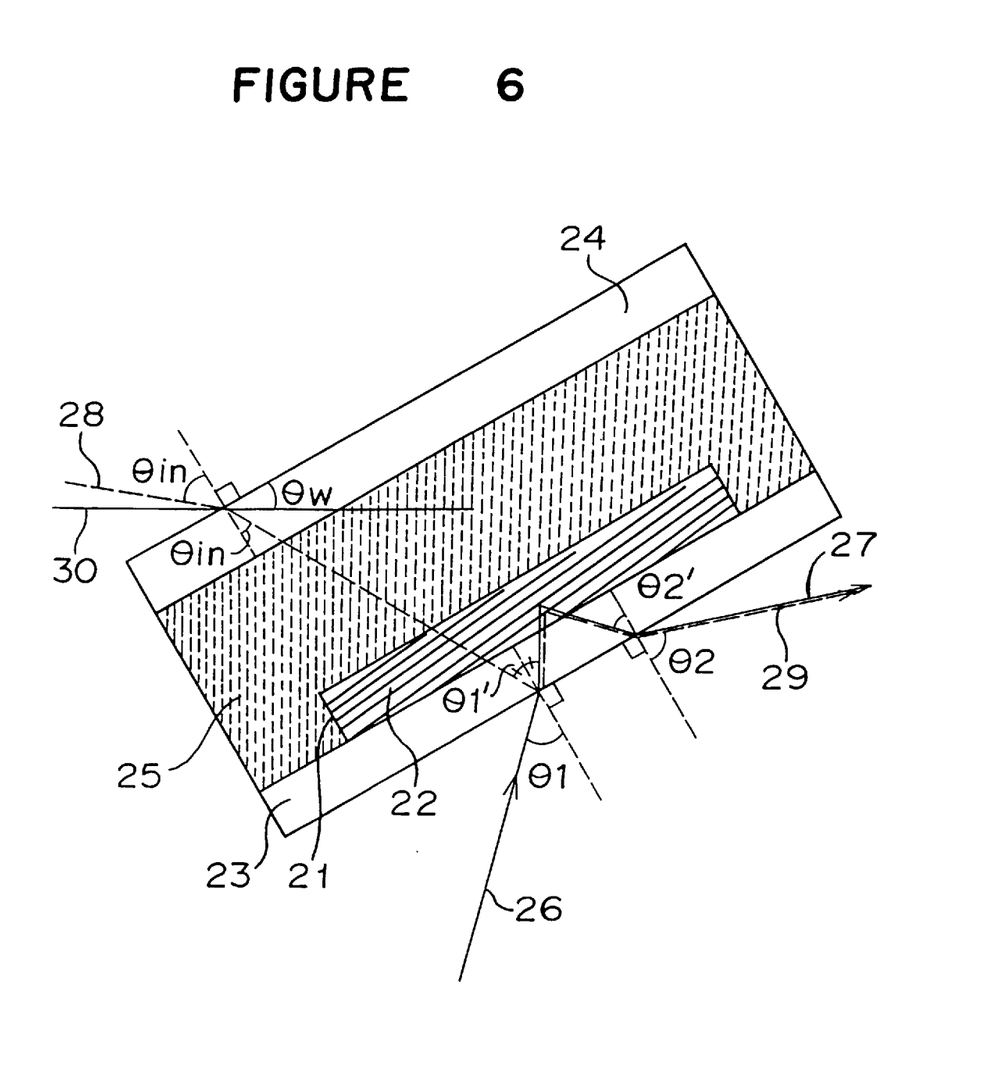
FIG. 6 is an enlarged cross-sectional view partly omitted of an embodiment of a hologram wherein the hologram is sealed in a windshield glass.

In more detailed description, FIG. 6 is an enlarged cross-sectional view partly broken which shows a case that the hologram is sealed inside the windshield glass. Numeral 22 designates a reflection type hologram functioning as a combiner. Inside the hologram 22, diffraction gratings having a slant to the surface as shown in the drawing are formed. The hologram 22 is disposed at a cabin side glass 23 of the windshield glass and is sealed at the inner side of an outside glass 24 together with an interlayer 25 composed of polyvinyl butyral (PVB) to thereby form a safety laminated glass. The interface 21 between the interlayer 25 and the hologram 22 provides a protection layer wherein the characteristics of the hologram do not suffer influence by the presence of plasticizer contained in the interlayer.

Light 26 including information, which is emitted from an information display source, enters into the cabin side glass 23 at an angle $\theta_1$ and is refracted at an angle $\theta_1'$ in the glass due to the difference of refractive indices of air and glass. The light in the glass is reflectively diffracted toward the driver by the hologram 22. Since the diffraction gratings in the hologram are slanted to the surface of it, the angle of diffraction light in the glass is $\theta_2'$. The diffraction light is refracted at the glass surface to emit toward the vehicle cabin at an angle $\theta_2$ so that it is recognized as light 27 by an observer such as the driver. Generally, $\theta_1$ and $\theta_2$ are different from each other in order to prevent the formation of a double image due to reflection light caused by the surface of the outside glass. Further, for a sedan, there is a relation of $\theta_1 < \theta_2$ in consideration of positions of the light source, the combiner and the driver.

When an outer light 28 indicated by a dotted line enters into the vehicle provided with such a hologram HUD, and when an incident angle $\theta$ in is a specified angle, the outer light reaches the surface of the cabin side glass at an angle $\theta_1'$ and is reflected to the inside of the glass at $\theta_1'$. Since this angle is the same as the angle of the light 26 containing information in the glass, the outer light is reflectively diffracted by the hologram 22 to emit from the surface of the cabin side glass at an angle $\theta_2$, whereby the light reaches as numeral 29 together with the light 27 containing information to the observer such as the driver. A noise light caused by such outer light is called a flare light.

The flare light provides a non-uniform luminance or a brilliant spot depending on an incident angle of light from outside of the vehicle, which gives an undesired influence such as a reduction of visibility of a display image by the HUD. In particular, when sunlight is observed as a flare light, it may cause a dazzle because of high luminance and there is a problem of safetyness. Further, in night, a weak light such as a street light which does not draw the drivers attention in a daytime is observed as a flare light because the atmosphere is dark, and it is very bothering in driving. Since the flare light is observed at an angle which is different from a case that the driver looks straight at outer light source such as the sun or a street light, the driver sees a single light source as if there are a plurality of light sources, which is also bothering.

In order to prevent such disadvantage, an anti-reflection layer should be provided at a cabin side with respect to the hologram, whereby occurrence of flare light due to an outer light can be effectively reduced.

Beside of providing the anti-reflection layer, there is a technique to reduce the flare light as follows. Namely, diffraction gratings should be formed in the hologram so that the direction of the entering of light, which form a flare light, to the hologram is below the horizontal direction. Namely, when the surface of the cabin side glass 23 is in parallel to the surface of the outside glass 24, $\theta$in' is equal to $\theta_1'$ as shown in FIG. 6. Accordingly, a flare light is observed when $\theta$in=$\theta_1$. Supposing that an angle formed by a horizontal line 30 and the windshield glass is $\theta$w, the direction of the incidence of a flare light is lower than the horizontal line when $\theta$in=$\theta_1$<90°−$\theta$w, and the flare light can be effectively reduced. Since the windshield glass of vehicles generally has as a curved shape, the flare light is not observed in $\theta$in=$\theta_1$ strictly. However, since the curvature of the glass is not so large, the direction of the incidence of the flare light can be lower than the horizontal line as far as a relation of $\theta_1 > 90° - \theta w$ is generally satisfied.

Figure 7:
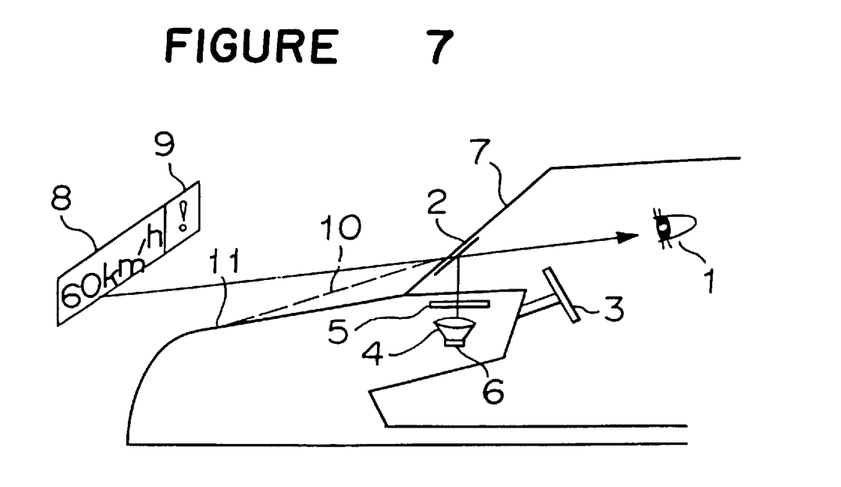
FIG. 7 is a schematic view showing an embodiment of the HUD of the present invention.

Description will be made specifically to a vehicle provided with the windshield glass having an inclination angle $\theta w$ of 45°. A hologram was prepared by exposure to light in such a manner that light 3 containing information enters into a combiner 2 of the hologram at an incident angle $\theta_1$ of 50° and is emitted therefrom at an outgoing angle $\theta_2$ of 65°, and the hologram was sealed in the windshield glass. Such arrangement satisfies a relation of $\theta_1(50°) > 90 - \theta w (45°)$. It is understood that the direction of incidence 10 of the flare light shown in FIG. 7 is 5° lower than the horizontal line. As a result, it is possible to prevent light from the above as sunlight or a street light, as a flare light, from entering into the vehicle.

Further, by adjusting a position of the combiner 2 on the windshield glass so that the front cover is located on an extension line of the direction of incidence 10 of the flare light, it is possible to prevent an outer light at an uphill road or light from the tail lamp of a proceeding car from entering into the vehicle.

What is claimed is:

1. A head-up display which comprises:

an information display source, comprising at least a light source for producing light and a display device for displaying information which is displayed by means of the light; and a combiner arranged on a windshield glass of a vehicle to diffract the light to an observer in the vehicle;

said combiner including a hologram which has a diffraction spectrum with at least three diffraction peaks, each of said diffraction peaks having a central wavelength $\lambda$, a half width $\Delta\lambda$ and a diffraction efficiency $\eta$ with respect to the light produced from the information display source and diffracted toward the observer inside the vehicle, said sets of central wavelength, half width and diffraction efficiency having values which cause a color difference between the color tone of the light from the light source and the average color tone of the light reflected from the combiner over the angles of observation to be minimized or which cause the sum of the square of a color difference between the color tone of the light from the light source and the color tone of the light reflected by the combiner to be minimized, wherein each of the three central wavelengths is within one of the ranges of 580–650 nm, 500–570 nm and 420–490 nm, where the color difference is defined to be a color difference $\Delta E^*_{ab}$ according to the L*a*b* color system ruled in JIS-Z8730 and is expressed by $\Delta E^*_{ab} = \{(\Delta L^*)^2 + (\Delta a^*)^2 + (\Delta b^*)^2\}^{1/2}$ where $\Delta L^*$ is the difference of psychometric lightness and $\Delta a^*$ and $\Delta b^*$ are the differences of psychometric chroma coordinates which causes the color tone of the light from outside the vehicle through the combiner to the observer and color tone of the light reflected by the combiner to the outside of the vehicles to be close to white.

2. The head-up display according to claim 1, wherein the difference of psychometric lightness is $\Delta L^* = 0$.

3. The head-up display according to claim 1, wherein the combiner is sealed in the windshield glass or attached to the windshield glass at the inner side of the vehicle, and an anti-reflection layer is provided on the combiner at the inner side of the vehicle.

4. The head-display according to claim 1, wherein the combiner is a single layered hologram exposed-multiple times to light having a plurality of central wavelengths.

5. The head-up display according to claim 1, wherein the combiner comprises a plurality of laminated holograms each exposed to light having a single central wavelength or a plurality of central wavelengths.

6. The head-up display according to claim 1, wherein incident angles of the color lights entering from the information display source to the combiner are substantially the same, and diffraction angles of the color lights diffracted by the combiner are substantially the same.

7. A combiner for a head-up display which is disposed on a windshield glass of a vehicle to diffract light carrying information from an information display source toward an observer in the vehicle, the combiner comprising:

a hologram which has a diffraction spectrum with at least three diffraction peaks, each of said diffraction peaks having a central wavelength $\lambda$, a half width $\Delta\lambda$ and a diffraction efficiency $\eta$ with respect to the light produced from the information display source and diffracted toward the observer inside the vehicle, said sets of central wavelength, half width and diffraction efficiency having values which cause a color difference between the color tone of the light from the information display source and the average color tone of the light reflected from the combiner over the angles of observation to be minimized or which cause the sum of the square of a color difference between the color tone of the light from the information display source and the color tone of the light reflected by the combiner to be minimized, wherein each of the three central wavelengths is within one of the ranges of 580–650 nm, 500–570 nm and 420–490 nm, where the color difference is defined to be a color difference $\Delta E^*_{ab}$ according to the L*a*b* color system ruled in JIS-Z8730 and is expressed by $\Delta E^*_{ab} = \{(\Delta L^*)^2 + (\Delta a^*)^2 + (\Delta b^*)^2\}^{1/2}$ where $\Delta L^*$ is the difference of psychometric lightness and $\Delta a^*$ and $\Delta b^*$ are the differences of psychometric chroma coordinates which causes the color tone of the light from outside the vehicle through the combiner to the observer and the color tone of the light reflected by the combiner to the outside of the vehicle to be close to white.

8. The combiner according to claim 7, wherein the hologram is of a single layer exposed multiple times to light having a plurality of central wavelengths.

9. The combiner according to claim 7, wherein the hologram has a plurality of layers laminated, each exposed to light having a single wavelength or a plurality of central wavelengths.

10. The combiner according to claim 7, wherein the difference of psychometric lightness is $\Delta L^* = 0$.

11. A method of designing a head-up display comprising:

an information display source, comprising at least a light source for producing light and a display device for displaying information which is displayed by means of the light; and a combiner arranged on a windshield glass of a vehicle to diffract the light to an observer in the vehicle;

said combiner including a hologram which has a diffraction spectrum with at least three diffraction peaks each of said diffraction peaks having a central wavelength $\lambda$, a half width $\Delta\lambda$ and a diffraction efficiency $\eta$ with respect to the light produced from the information display source and diffracted toward the observer inside the vehicle, said sets of central wavelengths, half width and diffraction efficiency having values which cause a color difference between the color tone of the light from the light source and the average color tone of the light reflected from the combiner over the angles of observation to be minimized or which cause the sum of the square of a color difference between the color tone of the light reflected by the combiner to be minimized, wherein each of the three central wavelengths is within one of the ranges of 580–650 nm, 500–570 nm and 420–490 nm, where the color difference is defined to be a color difference $\Delta E^*_{ab}$ according to the L*a*b* color system ruled in JIS-Z8730 and is expressed by $\Delta E^*_{ab} = \{(\Delta L^*)^2 + (\Delta a^*)^2 + (\Delta b^*)^2\}^{1/2}$ where $\Delta L^*$ is the difference of psychometric lightness and $\Delta a^*$ and $\Delta b^*$ are the differences of psychometric chroma coordinates which causes the color tone of the light from outside the vehicle through the combiner to the observer and the color tone of the light reflected by the combiner to the outside of the vehicle to be close to white.

12. The method of designing a head-up display according to claim 11, wherein the difference of psychometric lightness is $\Delta L^* = 0$.

13. The method of designing a head-up display according to claim 11, wherein the combiner is a single layered hologram exposed multiple times to light having a plurality of central wavelengths.

14. The method of designing a head-up display according to claim 11, wherein the combiner comprises a plurality of laminated holograms each exposed to light having a single central wavelength or a plurality of central wavelengths.

15. The method of designing a head-up display according to claim 11, wherein incident angles of the color lights entering from the information display source to the combiner are substantially the same, and diffraction angles of the color lights diffracted by the combiner are substantially the same.

* * * * *